(12) United States Patent
Steinbeck

(10) Patent No.: US 6,819,758 B2
(45) Date of Patent: Nov. 16, 2004

(54) METHOD, SYSTEM, AND COMPUTER-READABLE MEDIA FOR PERFORMING SPEECH RECOGNITION OF INDICATOR TONES

(75) Inventor: Michelle L. Steinbeck, Omaha, NE (US)

(73) Assignee: West Corporation, Omaha, NE (US)

( * ) Notice: Subject to any disclaimer, the term of this patent is extended or adjusted under 35 U.S.C. 154(b) by 506 days.

(21) Appl. No.: 10/057,837

(22) Filed: Jan. 24, 2002

(65) Prior Publication Data

US 2003/0118174 A1 Jun. 26, 2003

Related U.S. Application Data

(60) Provisional application No. 60/344,925, filed on Dec. 21, 2001.

(51) Int. Cl.$^7$ ................................................ H04M 3/00
(52) U.S. Cl. .............................. 379/266.07; 379/211.03
(58) Field of Search .......................... 379/88.01, 93.18, 379/93.34, 207.05, 207.08, 211.03, 266.07, 907

(56) References Cited

U.S. PATENT DOCUMENTS

| | | | |
|---|---|---|---|
| 3,752,904 A | | 8/1973 | Waterbury |
| 4,752,676 A | | 6/1988 | Leonard et al. |
| 4,993,068 A | | 2/1991 | Piosenka et al. |
| 5,153,918 A | | 10/1992 | Tuai |
| 5,343,518 A | * | 8/1994 | Kneipp ..................... 379/355.1 |
| 5,412,727 A | | 5/1995 | Drexler et al. |
| 5,414,755 A | | 5/1995 | Bahler |
| 5,479,487 A | * | 12/1995 | Hammond ................ 379/88.22 |
| 5,499,289 A | * | 3/1996 | Bruno et al. ............ 379/266.07 |
| 5,513,250 A | | 4/1996 | McAllister |
| 5,581,630 A | | 12/1996 | Bonneau, Jr. |
| 5,623,539 A | | 4/1997 | Bassenyemukasa |
| 5,634,086 A | | 5/1997 | Rtischev |
| 5,638,430 A | | 6/1997 | Hogan et al. |
| 5,666,157 A | | 9/1997 | Aviv |
| 5,819,029 A | | 10/1998 | Edwards |
| 5,838,768 A | | 11/1998 | Sumar |
| 5,862,325 A | | 1/1999 | Reed et al. |
| 5,872,834 A | | 2/1999 | Teitelbaum |
| 5,884,262 A | | 3/1999 | Wise et al. |

(List continued on next page.)

OTHER PUBLICATIONS

VOICELOG, VoiceLog Announces Inbound that Delivers, Press Release, www.voicelog.com, Oct. 2, 2000.
VoicePrint Security for Credit Cards, IBM Technical Disclosure Bulletin, Feb. 1994, pp. 189–190, vol. 37, Publication No. 2B.
PriceInteractive Launches Most Reliable Anti–Slamming Service New Enhanced Third Party Verification (TM) Solutions Cut Carrier Costs By More Than Half, PR Newswire via NewsEdge Corporation, Jul. 1, 1999.

*Primary Examiner*—Bing Q. Bui
(74) *Attorney, Agent, or Firm*—West Corporation; Rocco L. Adornato

(57) ABSTRACT

An automated method for conducting an outdial telephone campaign, with the method comprising at least the following. At least one target telephone number is selected from a plurality of target telephone numbers, and the at least one target telephone number is dialed. A status resulting from the dialing is identified, including receiving an indicator signal, such as an SIT tone, resulting from the dialing of the at least one target telephone number and a message associated with the indicator signal, and automatically converting the message to a text equivalent. The status is associated with the at least one target telephone number. The above steps are repeated until the outdial campaign is complete. Apparatus, systems, and computer- or machine-readable media for performing the above method are also disclosed.

20 Claims, 4 Drawing Sheets

U.S. PATENT DOCUMENTS

| | | |
|---|---|---|
| 5,903,225 A | 5/1999 | Schmitt et al. |
| 5,915,001 A | 6/1999 | Uppaluru |
| 5,940,476 A | 8/1999 | Morganstein |
| 5,987,155 A | 11/1999 | Dunn et al. |
| 6,011,858 A | 1/2000 | Stock et al. |
| RE36,580 E | 2/2000 | Bogosian, Jr. |
| 6,038,334 A | 3/2000 | Hamid |
| 6,049,602 A | 4/2000 | Foladare et al. |
| 6,058,303 A | 5/2000 | Åstrom |
| 6,070,241 A | 5/2000 | Edwards |
| 6,084,967 A | 7/2000 | Kennedy |
| 6,091,835 A | 7/2000 | Smithies et al. |
| 6,092,192 A | 7/2000 | Kanevsky et al. |
| 6,094,476 A | 7/2000 | Hunt et al. |
| 6,119,084 A | 9/2000 | Roberts et al. |
| 6,144,938 A | 11/2000 | Surace et al. |
| 6,149,056 A | 11/2000 | Stinson et al. |
| 6,167,517 A | 12/2000 | Gilchrist et al. |
| 6,266,640 B1 | 7/2001 | Fromm |
| 6,275,940 B1 | 8/2001 | Edwards |
| 6,359,971 B1 | 3/2002 | Haimi-Cohen |
| 6,370,508 B2 | 4/2002 | Beck |
| 6,401,066 B1 | 6/2002 | McIntosh |
| 6,404,875 B2 * | 6/2002 | Malik et al. ............ 379/211.03 |
| 6,411,708 B1 * | 6/2002 | Khan ..................... 379/266.07 |
| 6,480,601 B1 * | 11/2002 | McLaughlin ........... 379/265.11 |
| 6,501,956 B1 | 12/2002 | Weeren et al. |
| 6,587,557 B1 * | 7/2003 | Smith .................... 379/265.01 |
| 6,604,075 B1 | 8/2003 | Brown |
| 6,650,736 B1 | 11/2003 | Unger |
| 6,721,778 B1 * | 4/2004 | Smith et al. ................ 718/103 |
| 6,744,881 B1 * | 6/2004 | Price ......................... 379/308 |

* cited by examiner

Record for "clean" call

| Phone number 250a | Time of call 250b | Indicator of "clean" status 250c | • • • |

250

Record for "dirty" call

| Phone number 260a | Time of call 260b | SIT tone identifier 260c | Text message corresponding to ASR output 260d | • • • |

260

METHOD, SYSTEM, AND COMPUTER-READABLE MEDIA FOR PERFORMING SPEECH RECOGNITION OF INDICATOR TONES

RELATED APPLICATIONS

This application claims the benefit of the filing date of U.S. provisional patent application serial No. 60/344,925, entitled "Method, System, and Computer-Readable Media for Performing Speech Recognition of SIT Tones" filed on Dec. 21, 2001.

BRIEF DESCRIPTIONS OF THE DRAWINGS

DETAILED DESCRIPTION OF ILLUSTRATIVE EMBODIMENTS

Method of Operation

Figure 1:
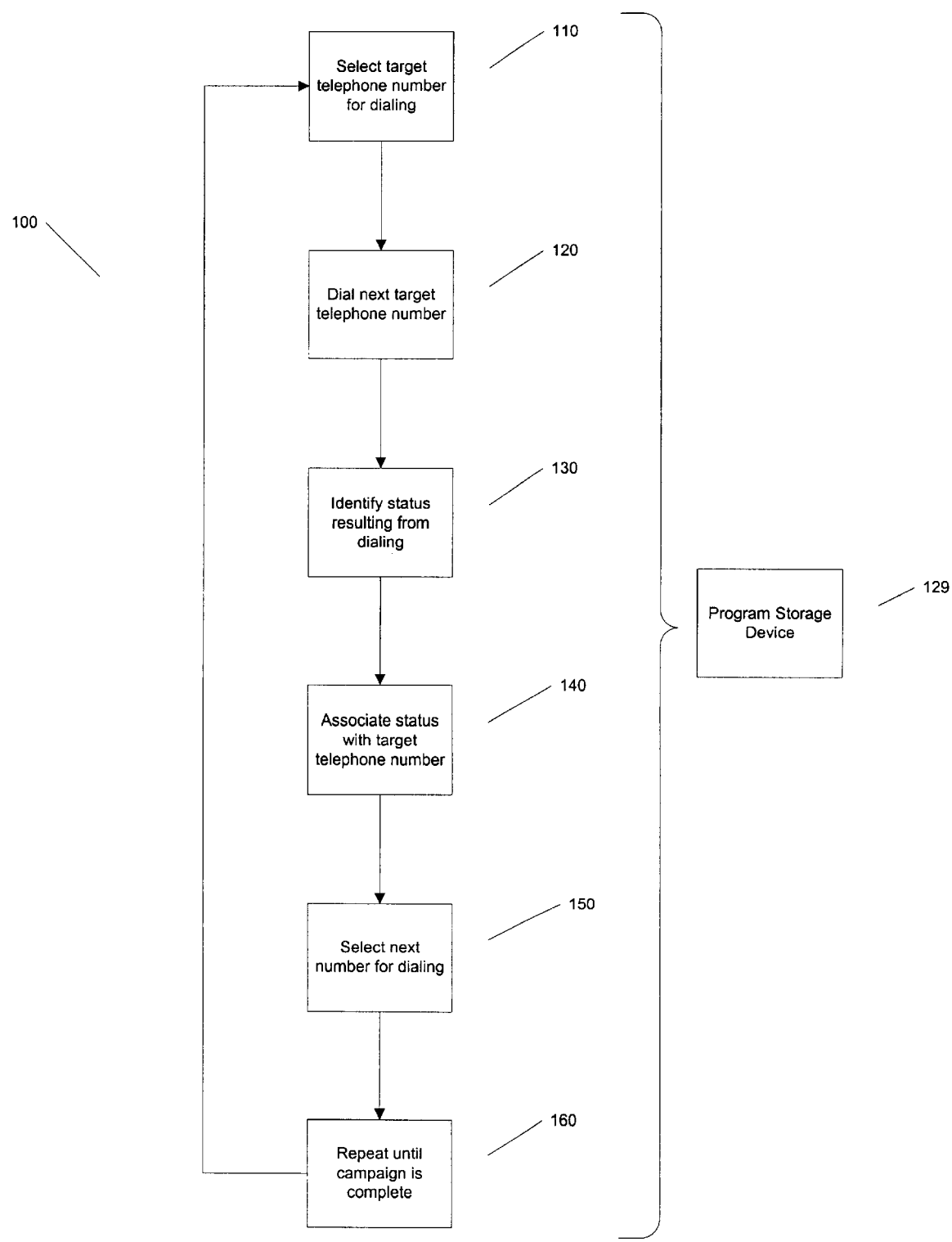
FIG. 1 is a flowchart illustrating a processing flow performed by an illustrative embodiment of the invention.

FIG. 1 is a flow chart illustrating a processing flow 100 performed by an illustrative embodiment of the invention.

At block 110, the method selects a target telephone number for dialing from a data store of target phone numbers received as input (shown by reference number 205 in FIG. 2), which may be received from a client for whom an outdial campaign is conducted, or from another entity. As a non-limiting example, if the method of invention is implemented in a service bureau context, the service bureau may contract with a client to conduct an outdial campaign on behalf of the client in exchange for a fee paid by the client to the bureau. The client, or some third party other than the client, then provides the data store 205 of phone numbers to be dialed by the bureau during the campaign. The campaign may serve any number of purposes, including as non-limiting examples, attempts to expand the customer base of the client, messages broadcast to the existing customer base of the client, or other types of campaigns as known by those skilled in the art. To maximize efficiency, the data store 205 may be stored on some computer-readable medium or media, loaded in bulk into an automated dialer (shown by reference number 210 in FIG. 2), and outdialed using known technology. The data store 205 can include phone numbers for current or prospective customers of the bureau's client, and can be gathered or provided from a variety of sources using a variety of methods, as appreciated by those skilled in the art.

As discussed in further detail below, the data store 205 can include phone numbers that are valid ("clean phone numbers") in the sense that the phone numbers correspond to active, live telephone account holders or subscribers who can be reached by dialing the number. However, the data store 205 can also contain phone numbers that are, for one reason or another, invalid ("dirty phone numbers"). Invalid phone numbers can include those numbers that have been deactivated because the account holder or subscriber has moved, disconnected because the subscriber failed to pay service charges, changed per subscriber request, or for some other the telephone network cannot successfully connect a call to that number. At the conclusion of the campaign, the bureau client would benefit from knowing which numbers in the data store 205 of telephone numbers were "dirty" numbers, so the data store 205 can be revised accordingly to eliminate those numbers or replace them with current valid numbers. Such a revision would enable the client to avoid the expense of having "dirty" numbers dialed in future outdialing campaigns and maximize the probability of reaching intended call recipients with each number dialed.

As represented in block 120, the method 100 dials the next target telephone number received from the data store 205. The method then identifies any status resulting from the target telephone number being dialed, as represented by block 130. After receiving the status resulting from the dialing, the method associates the status with the target telephone number being dialed, as represented by block 140. After processing associated with the current target telephone number is complete, the method selects the next telephone number for dialing, as represented in block 150. This next number for dialing can be either the next phone number in the input list 205, or can be any preceding number that needs to be redialed because previous efforts to dial that number failed. The method then proceeds to block 160, where the processing represented by blocks 120, 130, 140, 150, and 160 is repeated until the outdial campaign is complete.

Figures 1A, 2A, 2B:
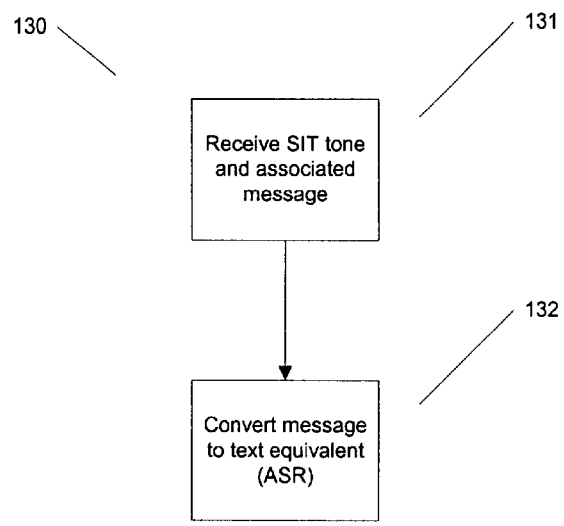
FIG. 1A is a flowchart illustrating in more detail a processing flow represented by a status identification block shown in FIG. 1.
FIG. 2A is a diagram of a sample data structure that may be used to store and process data associated with telephone numbers that are dialed successfully.
FIG. 2B is a diagram of a sample data structure that may be used to store and process data associated with telephone numbers that are not dialed successfully.

FIG. 1A is a flowchart illustrating in more detail a processing flow represented by a status identification block 130 shown in FIG. 1. In an illustrative embodiment of the invention, the processing represented by status identification block 130 can include receiving an indicator signal, such as a Special Information Tone (SIT), from the telephone network, along with a message associated with the tone, as shown in block 131. As known in the art, SIT tones are sequences of audio signals or standardized tones that precede prerecorded messages (known as "operator intercepts") used by telephone companies to inform callers that a call could not go through and why. For example, the message may inform a calling entity that the dialed number has been disconnected or is otherwise out of service. If a subscriber has moved or changed numbers, the message might provide a new number for the subscriber. However, those skilled in the art will appreciate that the invention may be extended to operate with other electrical signals that indicate that a problem occurred while dialing a given number.

In block 132, or at other execution points as deemed appropriate when implementing the method 100, the method 100 can employ speech recognition engine 231 (discussed in further detail in connection with FIG. 2) to process speech or voice messages received from the telephone network when a "dirty" number is dialed, resulting in an operator intercept and receipt of an SIT tone. Appropriate speech recognition technology is available from Nuance Communications, Inc. of Menlo Park, Calif. (www.nuance.com), although it will be understood that the instant invention is not limited to using Nuance technology; other vendors of speech recognition systems may offer technology that is equally suited for practicing the invention. Where speech recognition technology is deployed, the indicator signal or SIT tone can be a cue to the speech recognition system to capture a speech waveform or message following the signal or tone for analysis, for example, to determine the text of the message played by the telephone network. The text equivalent of the speech waveform is typically more compact and more efficiently stored, and lends itself to subsequent processing more readily than the speech waveform. The results of this analysis can be associated in the output list with the specific "dirty" phone number that prompted the message. An automatic speech recognition (ASR) platform or engine 231 provides for "automatic" text conversion, as distinguished from a human operator listening to each message resulting from operator intercepts occurring during the entire outdial campaign. Clearly, performing these conversions with human operators would not be cost effective in most mass outdial campaigns.

Figure 3:
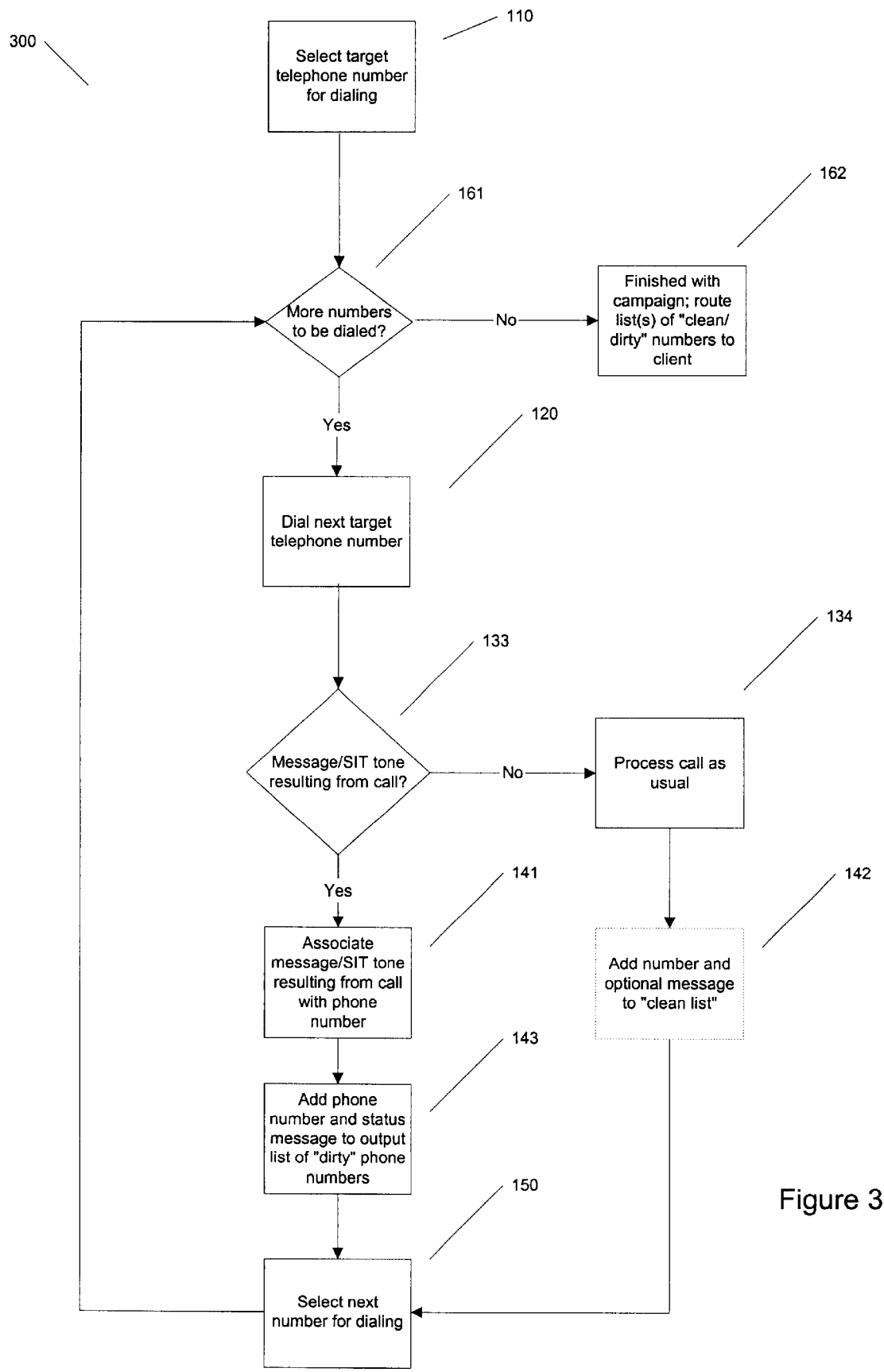
FIG. 3 is a flowchart illustrating in more detail a processing flow performed by the illustrative embodiment of the invention as shown in FIG. 1.

FIG. 3 is a flowchart 300 illustrating in more detail a processing flow performed by the illustrative embodiment of the invention 100 as shown in FIG. 1. Reference numbers appearing in both FIGS. 1 and 3 refer to identical processing.

Block 110 is the same as shown in FIG. 1. At block 161, the method evaluates whether target phone numbers remain to be dialed. For example, the method may have to dial additional numbers appearing on the data store 205 or may have to retry calling numbers that have been previously dialed unsuccessfully. If so, the method proceeds to block 120, where the method dials the next uncalled number in the data store 205, or retries a previously called number. If the method is processing the first number in the list, the method simply selects the first number in the list and dials that number. Block 161 controls whether it is necessary to perform another iteration through the loop shown in FIGS. 1 and 3.

At block 133, the method evaluates whether an operator intercept, a message, or an indicator signal, such as a Special Information Tone (SIT) tone, results from the current phone number being dialed. If an SIT tone and/or related message results from the number being dialed, the method proceeds to block 141. At this point, the method recognizes that some type of problem likely has occurred either with the phone number being dialed or with the telephone network itself. At block 141, the method associates any message, indicator signal or SIT tone resulting from the phone call with the current phone number being dialed. Assuming a computer-based implementation of this method 100, the association referenced in block 141 would be performed by manipulating data structures, such as those illustrated in FIGS. 2A and 2B, discussed below.

At block 143, the method adds the current phone number and any associated descriptive status messages to an output list of "dirty" phone numbers. As discussed above, the descriptive status message can be a text equivalent of the speech waveform captured by the method from the telephone network. Again, data structures such as those shown in FIG. 2B may be suitable.

At block 150, the method proceeds to select the next phone number in the list, and processing returns to block 161. At block 161, the method of the invention evaluates whether any phone numbers remain to be called. If yes, the method proceeds to block 120 to dial the next number, and processing proceeds as described above.

Returning to block 161, if there are no numbers to be dialed, the method proceeds to block 162. At this point, the method concludes that the outdial campaign is complete and proceeds to compile lists of "clean phone numbers" and/or "dirty phone numbers" in a report to be delivered to the client for whom the outdial campaign was conducted, or to an entity other than the client. It will be appreciated by those skilled in the art that a report prepared for the client or other party in accordance with the invention can take any number of forms, including separate reports on "clean" numbers that were successfully called and on "dirty" numbers that resulted in SIT tones/messages. Alternatively, the method could generate an integrated report including both "clean" and "dirty" numbers. Further, the reports described herein could be arranged in the order in which the target telephone numbers were listed in the original input file, or in any other order dictated by the requirements of a given application of the invention.

Returning briefly to block 133, if no message or SIT tone results from the current telephone number being dialed, the method of the invention proceeds to block 134, where the current phone call is processed as usual for the given outdial campaign. If the method reaches block 134, the currently dialed phone was most likely dialed successfully. After the processing represented by block 134 is complete, the method proceeds to an optional block 142, whose optional status is indicated by the dashed outline surrounding its representation in FIG. 3. The processing represented by optional block 142 can include adding the current number to a data structure storing "clean" numbers in order to support the generation and delivery of lists including both "clean phone numbers" and "dirty phone numbers," as discussed above, to provide complete feedback to the client regarding each number included on the input list of phone numbers.

System Description

Figure 2:
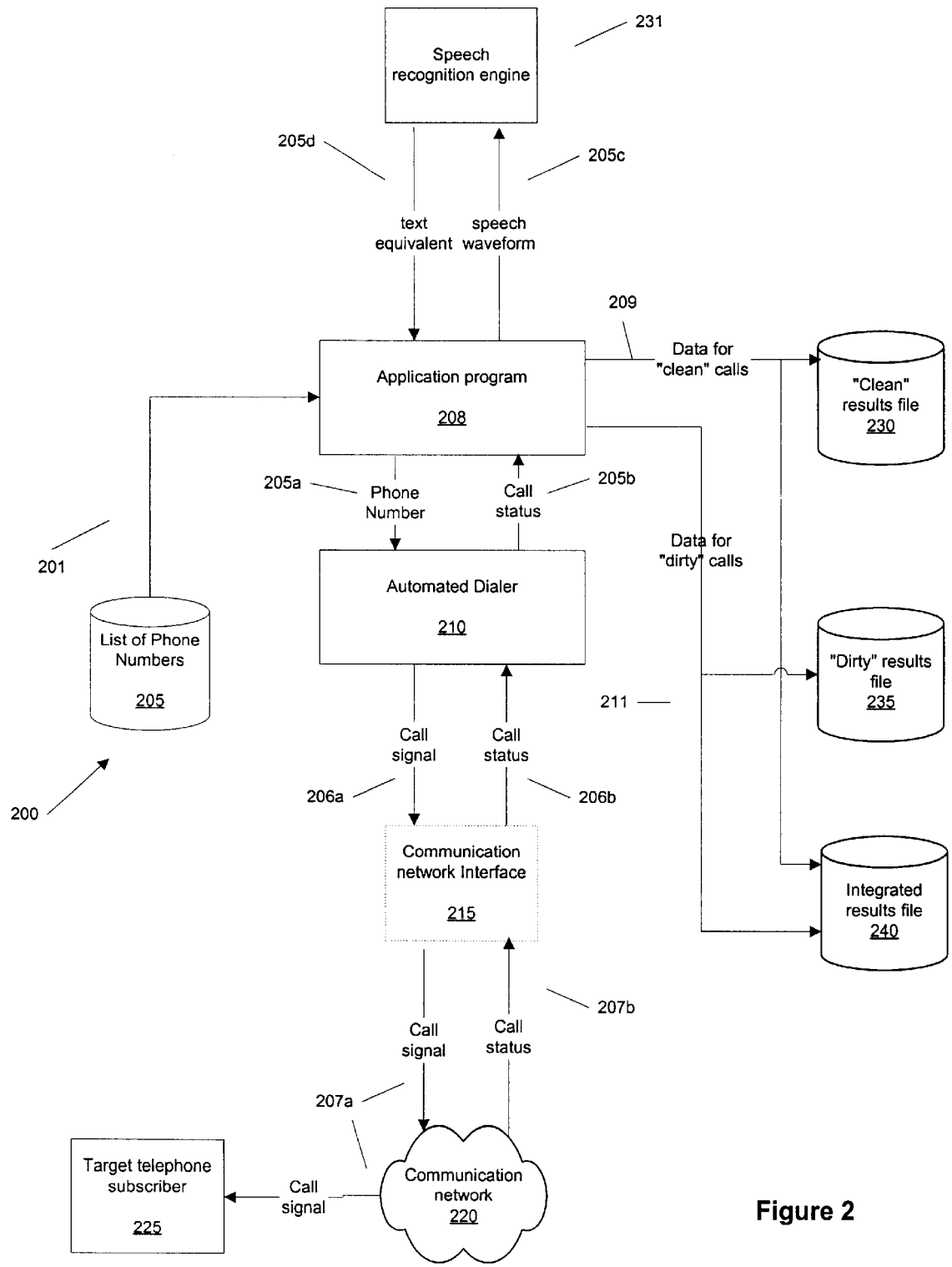
FIG. 2 is a block diagram illustrating an example data flow through illustrative apparatus constructed in accordance with an embodiment of the invention.

FIG. 2 is a block diagram illustrating an example data flow through illustrative system 200 constructed in accordance with an embodiment of the invention. An application program 208 is coupled to communicate with a data store 205, which stores a list of target telephone numbers received from a client or other party. Application program 208 and data store 205 communicate over link 201, which may be implemented using any number of available technologies, depending on the implementations chosen for and the locations of data store 205 and application program 208. In general, the application program 208 embodies the rules applicable to a given outdial campaign, and in an illustrative embodiment of the invention, the application program is customized according to the rules specified for each given outdial campaign. Example non-limiting parameters that are governed by rules during a given campaign include: the number of times to try redialing a given number, whether to distinguish between a human or a machine answering at a given number, how to react to a human or machine answering at the number, how/when to transfer to a live operator, or the like.

The application program 208 implements the applicable rules when executing the various aspects of the method discussed above and shown in the drawing figures, and can be coded using any suitable programming or scripting language. However, it is to be understood that the invention as described herein is not dependent on any particular operating system, environment, or programming language. Example operating systems include without limitation LINUX, UNIX, or any of the Windows™-family of operating systems, and example languages include without limitation a variety of structured and object-oriented languages such as C, C++, Visual Basic, or the like.

As those skilled in the art will understand, the application program 208 can be loaded and stored onto a program storage device 129 (see FIG. 1) readable by a computer or other machine, embodying a program of instructions executable by the machine to perform the various aspects of the method as discussed and claimed herein, and as illustrated in the Figures, for conducting an outdial telephone campaign. Generally speaking, the program storage device 129 can be implemented using any technology based upon materials having specific magnetic, optical, or semiconductor properties that render them suitable for storing computer data, whether such technology involves either volatile or nonvolatile storage media. Specific examples of such media can include, but are not limited to, magnetic hard or floppy disks drives, optical drives or CD-ROMs, and any memory technology based on semiconductors or other materials, whether implemented as read-only or random access memory. Those skilled in the art will also understand that a computer programmed in accordance with the above teaching using known programming languages provides means for realizing the various functions, methods, and processes as described and claimed herein and as illustrated in the drawing figures attached hereto. It will be further be understood that the application program 208 could be hosted and executed on a variety of hardware, including but not limited to the automated dialer 210 or a processor residing on a separate server or computer system.

The application program 208 communicates with the automated dialer 210 over communication links 205a and 205b. The application program 208 generates signals representing target telephone numbers on line 205a using the methods illustrated in FIGS. 1 and 3, and awaits the call status return resulting from the current number being dialed on line 205b. The technologies used to implement lines 205a and 205b will depend on the same considerations applicable to communication line 201 as discussed above.

The automated dialer 210 receives successive phone numbers from the data store 205 through application program 208 and dials them, as understood in the art. For each telephone number provided in the data store 205, the automated dialer 210 generates an appropriate call signal along line 206a to a communication network interface 215. Suitable automated dialers 210 are known in the art and are available for a variety of vendors.

Communication network interface 215 includes the necessary switches, routers, and other hardware and software necessary to efficiently interface the automated dialer 210 to the communication network 220. The exact configuration of the communication network interface 215 will depend on the technology implementing communication network 220. In some implementations where the signals from the automated dialer 210 are compatible with the communication network 220, the communication network interface 215 may not be necessary, as indicated by its dashed outline in FIG. 2. In any event, the overall function of the communication network interface 215 is to convert the electrical signals on line 206a to corresponding electrical signals on line 207a that are compatible with the communication network 220, where necessary, or to make connections between the automated dialer 210 and the communication network 220 economical and efficient.

Various embodiments are envisioned for communication network 220. One embodiment would utilize the conventional public switched telephone network (PSTN) as known in the art. Another embodiment would utilize emerging technology such as Voice Over IP, which enables telephone call signals to be transmitted over a wide area global communications network such as the Internet. More generally, any technology that enables the automated dialer 210 to place calls to target telephone subscriber 225 may be useful for practicing the invention as described herein.

Ultimately, the telephone call is routed to the target telephone subscriber 225. The status of the call to the target telephone subscriber 225 is reflected in an electrical signal carried by line 207b, which is routed from the communication network 220 to the communication network interface 215. The communication network interface 215 routes the status of the outgoing call along line 206b back to the automated dialer 210, converting the signals as necessary to ensure compatibility between the communication network 220 and the automated dialer 210. The automated dialer 210 then passes the status back to the application program 208 using line 205b.

The application program 208 interprets the call status to determine whether the call was successfully completed or not. If the call was successfully completed (a "clean" call), a data record corresponding to that call is routed along line 209 to a clean results file 230 and/or an integrated results file 240. Conversely, if the telephone call was not completed for any reason (a "dirty" call), data corresponding to that call is routed along line 211 to a "dirty" results file 235 and/or an integrated results file 240. Alternatively, the "dirty" number can be redialed any number of times, as dictated by the rules applicable to a given outdial campaign. After processing a given call is complete, the application program 208 can either redial previous numbers that were not dialed successfully, or can access the data store 205 to obtain the next target phone number for dialing.

Application program 208 can utilize a speech recognition engine 231, and communicates therewith along lines 205c and 205d. "Dirty" phone calls are characterized by an operator intercept and SIT tone and related message received along lines 207b, 206b and 205b. If the application program 208 receives an SIT tone and related message, the application program 208 can send the speech waveform representing the related message along line 205c to the speech recognition engine 231. As discussed above, technology suitable for implementing the speech recognition engine 231 is available from vendors such as Nuance Communications, Inc. Speech recognition engine 231 then processes the input speech waveform, produces a converted text equivalent of the speech waveform, and provides that equivalent along line 205d to the application program 208. The application program 208 can then forward this text equivalent for storage in "dirty" results file 235 and/or integrated results file 240. In other embodiments of the invention, the application program 208 can process any messages related to "clean" phone calls in the same manner, forwarding the text equivalents to "clean" results file 230 instead.

It will be understood by those skilled in the art that the technology used to implement the various communication lines, such as lines 201, 205a–d, 206a–b, 207a–b, 209 and 211 can readily be chosen using conventional technology. The specific technology chosen will depend upon the communication through-put requirements, as well as the geographic distance between the various components communicating using these lines.

Description of Data Structures

FIG. 2A is a diagram of a sample data structure that may be used to store and process data associated with telephone numbers that are dialed successfully. FIG. 2A illustrates an example record 250 corresponding to a telephone call that is successfully placed to target telephone subscriber 225. In the example shown, one record 250 would correspond to each telephone number contained in the data store 205 of target telephone numbers. The respective fields comprising record 250 as shown in FIG. 2A, are illustrative only and are not to be considered as limiting the invention. Specifically, those skilled in the art will understand that the names, content, layout, and structure of the record 250 shown in FIG. 2A can be varied or modified as required in a given implementation of the invention. Additional fields may be appropriate, as indicated by the trailing ellipses shown in FIG. 2A and also in FIG. 2B discussed below. In the example record 250 shown, a first field 250a contains the phone number dialed by the system. A second field 250b can store the time at which the phone number shown in field 250a was dialed. A third field 250c can store an indicator showing that the call was successfully completed. As discussed above, additional fields may be added by those skilled in the art without departing from the scope of the invention as described herein or these fields may be combined or integrated into other fields.

FIG. 2B is a diagram of a sample data structure that may be used to store and process data associated with telephone numbers that are not dialed successfully. As shown in FIG. 2B, a sample record 260 contains several example fields. A first field 260a stores the phone number associated with a given call, similarly to the field 250a shown in FIG. 2A. A second field 250b can store the time at which a call attempt is made, similarly to the second field 250b shown in FIG. 2A. A third field 260c stores data corresponding to an SIT tone identifier. A fourth sample field 260d can store a text message corresponding to the output of an automated speech recognition process described above. As understood by those skilled in the art, when a destination telephone number is inactive, or cannot be dialed for some reason, the communication network 220 issues a signal such as an SIT tone identifier, which is audible to the entity dialing the number. The SIT tone identifier or other signal is followed by a text message played by the network 220 to indicate the reason for the unsuccessful call. A speech recognition engine can analyze this message and generate a corresponding text message that can be stored in 260d. In this manner, the system 200 can provide detailed feedback on virtually every number dialed during a given outdial campaign, particularly those numbers that were not successfully dialed. The entity that provided the phone number database 205 and receives this feedback can edit the phone number database 205 according to this feedback.

As discussed above in the "method" section, one or more of the output files including "clean" results file 230, "dirty" results file 235, and integrated results file 240 can be forwarded to the entity that provided the phone number database 205.

Those skilled in the art will further recognize that the data represented in FIGS. 2A and 2B can be stored in separate respective records 250 and 260, or could be combined into an integrated record storing data associated with both "clean" calls and "dirty" calls. The embodiments shown in FIGS. 2A and 2B are illustrated merely for convenience in illustrating the respective data associated with "clean" calls and "dirty" calls, and is not intended to limit the application of the invention as described herein.

The above description and the drawing figures associated with this description describe illustrative aspects of the invention, and is not intended to limit the invention. Instead, those skilled in the art will recognize that the concepts described and illustrated above may be extended, varied, or modified without departing from the scope of the invention, which is defined by the claims appended below.

I claim:

1. An automated method for conducting an outdial telephone campaign, the method comprising at least the following:
   a) selecting at least one target telephone number from a plurality of target telephone numbers;
   b) dialing the at least one target telephone number;
   c) identifying a status resulting from the dialing, wherein identifying a status includes:
      receiving an indicator signal resulting from the dialing of the at least one target telephone number and a message associated with the indicator signal; and
      automatically converting the message to a text equivalent;
   d) associating the status with the at least one target telephone number; and
   e) repeating a) through d) until the outdial campaign is complete.

2. The method of claim 1, further comprising receiving a list containing the plurality of the target telephone numbers.

3. The method of claim 2, wherein receiving a list includes receiving a list from a client of a teleservices firm.

4. The method of claim 2, wherein receiving a list includes receiving a list from an entity other than a client of a teleservices firm.

5. The method of claim 1, wherein dialing at least one target telephone number includes dialing the at least one target telephone number using a public switched telephone network.

6. The method of claim 1, wherein dialing a number includes dialing the target telephone number using Voice Over IP technology.

7. The method of claim 1, wherein identifying a status includes assigning a first status to a call if the call to the target telephone number was successfully connected, and assigning a second status to a call if the call to the target telephone number is not successfully connected.

8. The method of claim 7, wherein the assigning is done in response to the indicator signal.

9. The method of claim 1, wherein converting the message includes executing a speech recognition algorithm on the message to produce the text equivalent.

10. The method of claim 1, wherein associating the status includes populating a computer based data structure with data related to the target telephone number being dialed.

11. The method of claim 10, wherein associating the status includes populating computer based data structures storing data respectively for calls that are placed successfully and for calls that are placed unsuccessfully.

12. The method of claim 11, wherein populating includes inserting data corresponding to the message.

13. The method of claim 1, further comprising reporting the results associated with at least a first plurality of the numbers to an entity that provided the list of target telephone numbers.

14. The method of claim 1, wherein identifying a status resulting from the dialing includes receiving an SIT signal resulting from the dialing of the at least one target telephone number and a message associated with the SIT signal.

15. A program storage device readable by a machine, tangibly embodying a program of instructions executable by the machine to perform a method for conducting an outdial telephone campaign, the method comprising at least the following:
   a) selecting at least one target telephone number from a plurality of target telephone numbers;
   b) requesting a dialing of the at least one target telephone number;
   c) identifying a status resulting from the dialing, wherein identifying a status includes:
      receiving an indicator signal resulting from the dialing of the at least one target telephone number and a message associated with the indicator signal; and requesting an automatic conversion of the message to a text equivalent;

d) associating the status with the at least one target telephone number; and e) repeating a) through d) until the outdial campaign is complete.

16. The program storage device of claim 15, wherein identifying a status resulting from the dialing includes receiving an SIT signal resulting from the dialing of the at least one target telephone number and a message associated with the SIT signal.

17. Apparatus for conducting an outdial telephone campaign, the apparatus comprising at least the following:

a) means for selecting at least one target telephone number from a plurality of target telephone numbers;

b) means for requesting a dialing of the at least one target telephone number;

c) means for identifying a status resulting from the dialing, wherein the means for identifying a status includes:

means for receiving an indicator signal resulting from the dialing of the at least one target telephone number and a message associated with the indicator signal; and means for requesting an automatic conversion of the message to a text equivalent;

d) means for associating the status with the at least one target telephone number; and e) means for repeating a) through d) until the outdial campaign is complete.

18. The apparatus of claim 17, wherein the means for identifying a status resulting from the dialing include means for receiving an SIT signal resulting from the dialing of the at least one target telephone number and a message associated with the SIT signal.

19. A system for conducting an outdial telephone campaign, the system comprising at least the following:

a first data store containing a plurality of target telephone numbers; an application program executing on a general purpose computer system, communicating with the first data store and the speech recognition engine, and being configured to perform a method including at least the following:

a) receiving at least one target telephone number from the first data store;

b) requesting a dialing of the at least one target telephone number;

c) identifying a status resulting from the dialing, wherein identifying a status includes:

receiving an indicator signal resulting from the dialing of the at least one target telephone number and a message associated with the indicator signal; and requesting an automatic conversion of the message to a text equivalent;

d) associating the status with the at least one target telephone number; and e) repeating steps b) through d) until the outdial campaign is complete;

an automated dialer communicating with the application program to receive a request to dial the at least one target telephone number and being adapted to:

dial the at least one target telephone number in response to the request;

receive a signal representing the status resulting from the dialing; and send the signal to the application program;

a speech recognition engine adapted to convert automatically an input speech waveform into a corresponding text equivalent in response to a request from the application program; and at least a second data store communicating with the application program and storing data corresponding to the status resulting from the dialing.

20. The system of claim 19, wherein the method performed by the application program includes receiving an SIT signal resulting from the dialing of the at least one target telephone number and a message associated with the SIT signal.

* * * * *